United States Patent
Steinmetz et al.

(10) Patent No.: US 10,975,264 B2
(45) Date of Patent: Apr. 13, 2021

(54) HYDROXY-FUNCTIONAL POLYETHER-BASED REACTION PRODUCTS AND AQUEOUS BASE PAINT WHICH CONTAINS THE REACTION PRODUCTS

(71) Applicant: BASF COATINGS GMBH, Münster (DE)

(72) Inventors: Bernhard Steinmetz, Ruetschenhausen (DE); Peter Hoffmann, Senden (DE); Hardy Reuter, Muenster (DE)

(73) Assignee: BASF Coatings GmbH, Münster (DE)

( * ) Notice: Subject to any disclaimer, the term of this patent is extended or adjusted under 35 U.S.C. 154(b) by 74 days.

(21) Appl. No.: 16/084,657

(22) PCT Filed: Mar. 3, 2017

(86) PCT No.: PCT/EP2017/054997
§ 371 (c)(1),
(2) Date: Sep. 13, 2018

(87) PCT Pub. No.: WO2017/157695
PCT Pub. Date: Sep. 21, 2017

(65) Prior Publication Data
US 2019/0055426 A1    Feb. 21, 2019

(30) Foreign Application Priority Data
Mar. 14, 2016  (EP) .................................. 16160115

(51) Int. Cl.
| | | |
|---|---|---|
| *C09D 175/08* | (2006.01) | |
| *C08G 18/48* | (2006.01) | |
| *C08G 18/50* | (2006.01) | |
| *C08G 65/333* | (2006.01) | |
| *C08G 18/12* | (2006.01) | |
| *C08G 18/10* | (2006.01) | |
| *C08G 18/32* | (2006.01) | |
| *C08G 18/66* | (2006.01) | |
| *C08G 18/75* | (2006.01) | |
| *C09D 5/00* | (2006.01) | |
| *C09D 5/02* | (2006.01) | |

(52) U.S. Cl.
CPC .......... *C09D 175/08* (2013.01); *C08G 18/10* (2013.01); *C08G 18/12* (2013.01); *C08G 18/3206* (2013.01); *C08G 18/48* (2013.01); *C08G 18/4854* (2013.01); *C08G 18/5045* (2013.01); *C08G 18/6677* (2013.01); *C08G 18/755* (2013.01); *C08G 65/33348* (2013.01); *C09D 5/002* (2013.01); *C09D 5/022* (2013.01)

(58) Field of Classification Search
None
See application file for complete search history.

(56) References Cited

U.S. PATENT DOCUMENTS

| | | | |
|---|---|---|---|
| 4,914,148 A | 4/1990 | Hille et al. | |
| 5,334,420 A | 8/1994 | Hartung et al. | |
| 5,658,617 A | 8/1997 | Gobel et al. | |
| 6,001,915 A | 12/1999 | Schwarte et al. | |
| 6,248,225 B1* | 6/2001 | Palaika ............. | C08G 18/0814 204/484 |
| 6,583,214 B1 | 6/2003 | Haeberle et al. | |
| 6,632,915 B1 | 10/2003 | Schwarte et al. | |
| 6,737,468 B1 | 5/2004 | Bremser | |
| 8,211,504 B2 | 7/2012 | Wegner et al. | |
| 2015/0044380 A1* | 2/2015 | Matura ................... | C08K 5/10 427/385.5 |
| 2015/0044478 A1* | 2/2015 | Steinmetz ............. | B05D 7/534 428/423.1 |
| 2016/0017192 A1 | 1/2016 | Lutz | |
| 2017/0137662 A1 | 5/2017 | Steinmetz et al. | |

(Continued)

FOREIGN PATENT DOCUMENTS

| | | | |
|---|---|---|---|
| DE | 4009858 A1 | 10/1991 | |
| DE | 4010176 A1 | 10/1991 | |

(Continued)

OTHER PUBLICATIONS

International Search Report for International Patent Application No. PCT/EP2017/054997, dated Mar. 27, 2017, 3 pages.

(Continued)

*Primary Examiner* — Shamim Ahmed
*Assistant Examiner* — Bradford M Gates
(74) *Attorney, Agent, or Firm* — Armstrong Teasdale LLP

(57) ABSTRACT

Provided herein is a pigmented aqueous basecoat material including a hydroxy-functional polyether-based reaction product that is prepared by a urethane group-forming reaction of:

(a) at least one component including isocyanate groups that is prepared by the urethane group-forming reaction of at least one organic diisocyanate (a1) with at least one polyether (a2) of the general structural formula (I).

(I)

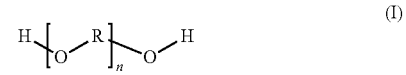

R is a $C_3$ to $C_6$ alkylene radical, and n is selected accordingly such that a polyether (b) possesses a number-average molecular weight of 500 to 5000 g/mol, the components (a1) and (a2) being used in a molar ratio of 1.8/1.7 to 3.0/1.0, and the resulting component (a) having an isocyanate content of 0.5 to 10.0% with (b) at least one organic polyol.

11 Claims, No Drawings

(56) References Cited

U.S. PATENT DOCUMENTS

| | | | |
|---|---|---|---|
| 2017/0137666 A1 | 5/2017 | Steinmetz et al. |
| 2017/0145252 A1 | 5/2017 | Steinmetz et al. |
| 2017/0158906 A1 | 6/2017 | Steinmetz et al. |
| 2017/0158907 A1 | 6/2017 | Steinmetz |
| 2018/0208782 A1 | 7/2018 | Steinmetz et al. |
| 2018/0355210 A1 | 12/2018 | Steinmetz et al. |
| 2018/0362798 A1 | 12/2018 | Steinmetz et al. |
| 2018/0362799 A1 | 12/2018 | Steinmetz et al. |
| 2019/0010353 A1 | 1/2019 | Steinmetz et al. |

FOREIGN PATENT DOCUMENTS

| | | | |
|---|---|---|---|
| DE | 4437535 A1 | 4/1996 |
| DE | 19914076 A1 | 9/2000 |
| DE | 19914896 A1 | 10/2000 |
| DE | 19930665 A1 | 1/2001 |
| DE | 19948004 A1 | 7/2001 |
| DE | 10043405 C1 | 6/2002 |
| EP | 0228003 A1 | 7/1987 |
| EP | 0521928 A1 | 1/1993 |
| EP | 0634431 A1 | 1/1995 |
| JP | 2002516388 A | 6/2002 |
| WO | 9115528 A1 | 10/1991 |
| WO | 9215405 A1 | 9/1992 |
| WO | 2015090807 A1 | 6/2015 |
| WO | 2016000952 A1 | 1/2016 |

OTHER PUBLICATIONS

European Search Report for EP Patent Application No. 16160115.8, dated Sep. 22, 2016, 3 pages.

* cited by examiner

HYDROXY-FUNCTIONAL POLYETHER-BASED REACTION PRODUCTS AND AQUEOUS BASE PAINT WHICH CONTAINS THE REACTION PRODUCTS

CROSS-REFERENCE TO RELATED APPLICATIONS

This application is the national stage entry of PCT/EP2017/054997, filed Mar. 3, 2017, which claims the benefit of priority to European Patent Application No. 16160115.8, filed Mar. 14, 2016, which are incorporated by reference in their entirety herein.

FIELD OF THE INVENTION

The present invention relates to innovative hydroxy-functional, polyether-based reaction products. It further relates to aqueous basecoat materials which comprise the reaction products and also to the use of said reaction products in aqueous basecoat materials. It additionally relates to a method for producing multicoat paint systems using aqueous basecoat materials, and also to the multicoat paint systems producible by means of said method.

Background

There are a multiplicity of known methods for producing multicoat color and/or effect paint systems (also called multicoat finishes). The prior art (compare, for example, German patent application DE 199 48 004 A1, page 17, line 37, to page 19, line 22, or German patent DE 100 43 405 C1, column 3, paragraph [0018], and column 8, paragraph [0052], column 9, paragraph [0057], in conjunction with column 6, paragraph [0039], to column 8, paragraph [0050]), for example, discloses the following method, which involves
(1) applying a pigmented aqueous basecoat material to a substrate,
(2) forming a polymer film from the coating material applied in stage (1),
(3) applying a clearcoat material to the resultant basecoat, and subsequently
(4) curing the basecoat together with the clearcoat.

This method is widely used, for example, for the original finish (OEM) of automobiles and also for the painting of metal and plastic parts for installation in or on vehicles. The present-day requirements for the technological qualities of such paint systems (coatings) in application are massive.

A constantly recurring problem and one still not resolved to complete satisfaction by the prior art is the mechanical resistance of the multicoat systems produced, particularly with respect to stonechip effects.

The qualities of the basecoat material, which is particularly important in this context, and of the coats produced from it are determined in particular by the binders and additives—for example, specific reaction products—present in the basecoat material.

A further factor is that nowadays the replacement of coating compositions based on organic solvents by aqueous coating compositions is becoming ever more important, in order to meet the rising requirements for environmental compatibility.

DESCRIPTION

The problem addressed by the present invention was therefore that of providing a reaction product which can be used to produce coatings that no longer have the disadvantages referred to above in the prior art. More particularly, the provision of a new reaction product and the use thereof in aqueous basecoat materials ought to create the opportunity for provision of coatings which exhibit outstanding adhesion qualities and very good stonechip resistance and which at the same time can be produced in an eco-friendly way through the use precisely of aqueous basecoat materials.

The problems stated have been solved by a pigmented aqueous basecoat material which comprises a hydroxy-functional, polyether-based reaction product which is preparable by reaction of
(a) at least one component containing isocyanate groups which is preparable by urethane group-forming reaction of at least one organic diisocyanate (a1) with at least one polyether (a2) of the general structural formula (I)

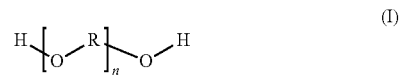

in which
R is a $C_3$ to $C_6$ alkylene radical and n is selected accordingly such that the polyether (b) possesses a number-average molecular weight of 500 to 5000 g/mol,
the components (a1) and (a2) being used in a molar ratio of 1.8/1.7 to 3.0/1.0 and the resulting component (a) having an isocyanate content of 0.5 to 10.0%
with
(b) at least one organic polyol,
where the amounts of components (a) and (b) are harmonized with one another such that the ratio of the molar amount of isocyanate groups in component (a) to the molar amount of component (b) is in a range from 0.33 to 0.95 and the resulting reaction product has a number-average molecular weight of 700 to 20 000 g/mol.

The condition that n is selected such that said polyether possesses a number-average molecular weight of 500 to 5000 g/mol may be illustrated as follows: Where, for example, R is a tetramethylene radical and the number-average molecular weight is to be 1000 g/mol, n is on average between 13 and 14. From the mandates given, the skilled person is well aware of how to produce or select a corresponding reaction product. Apart from this, the description below, and particularly the examples, further provide additional information. The parameter n is therefore to be understood as a statistical average value, just like the number-average molecular weight.

The new basecoat material is also referred to below as basecoat material of the invention. Preferred embodiments of the basecoat material of the invention are apparent from the following description and also from the dependent claims.

Likewise provided for the present invention is the reaction product per se and also the use of the reaction product in aqueous basecoat materials for improving the stonechip resistance. The present invention relates not least to a method for producing a multicoat paint system on a substrate and also to a multicoat system produced by the stated method.

Through the use of the reaction products of the invention, basecoat materials are obtained whose use in the context of production of coatings, especially multicoat paint systems, leads to very good stonechip resistance. The reaction product of the invention and also the basecoat material of the invention can be used in the area of original finishing, particularly in the automobile industry sector, and in the area of automotive refinish.

Component (a)

The reaction product of the invention is preparable using at least one specific component containing isocyanate groups. The component containing isocyanate groups is preparable by urethane group-forming reaction of at least one organic diisocyanate (a1) with at least one specific hydroxy-functional polyether (a2). Components (a1) and (a2) are used here in a molar ratio of 1.8/1.7 to 3.0/1.0, preferably of 1.8/1.6 to 2.5/1.0, more preferably 1.8/1.5 to 2.2/1.0. The organic diisocyanate (a1), accordingly, is used in a molar excess relative to the polyether (a2). This is in turn synonymous with the fact that component (a) contains isocyanate groups.

Where, for example, one molar equivalent of polyether (a2) is reacted with two molar equivalents of diisocyanate (a1), the result on average, and within intrinsic experimental margins of error, a blocklike product of the form A-B-A may result, where A stands for the reacted diisocyanate and B for the reacted polyether. Here, the two constituents A each contain an unreacted isocyanate group. Moreover, the product A-B-A has two bridging groups, namely urethane groups. The actual circumstances, which optionally deviate on the basis of experimental errors, may be simply found by taking account of the molecular weights of the starting compounds and undertaking comparison with the measured number-average molecular weight of component (a) and/or with the isocyanate content of component (a).

Where two molar equivalents of polyether (a2) are reacted with three molar equivalents of diisocyanate (a1), on average a blocklike product of the form A-B-A-B-A may result. Component (a) may therefore be described theoretically or on average, and not accounting for experimental deviations, by the formula A-(B-A)$_m$. The parameter m in this case represents a statistical mean value which of course, depending on the ratios of the starting compounds that are used, may also adopt uneven values. The skilled person is able to adapt the molar ratios without problems.

Also known are the underlying reaction mechanisms and reaction conditions for achieving linking of the hydroxyl groups with the isocyanate groups.

As organic diisocyanates (a1) it is possible to use the diisocyanates that are known per se, examples being hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)-cyclohexane, 1,4- or 1,3- or 1,2-diisocyanatocyclohexane, 2,4- or 2,6-diisocyanato-1-methylcyclohexane, meta-tetramethylxylene diisocyanate (TMXDI), and mixtures of these polyisocyanates. Preferred for use is IPDI.

The hydroxy-functional polyether (a2) may be described by the following general structural formula (I):

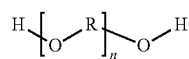

(I)

where R is a C$_3$ to C$_6$ alkyl radical and where the index n should be selected in each case such that said polyether possesses a number-average molecular weight of 500 to 5000 g/mol. With preference it possesses a number-average molecular weight of 500 to 4000 g/mol, more preferably of 550 to 3500 g/mol, and very preferably from 600 to 3200 g/mol. The number-average molecular weight may for example be 1000 g/mol, 2000 g/mol, or 3000 g/mol.

In the polyether (a2), all n radicals R may be the same. It is also possible, though, for different kinds of radicals R to be present. Preferably all the radicals R are the same. R is preferably a C$_4$ alkylene radical. More preferably it is a tetramethylene radical.

With very particular preference the polyether (a2) is a linear polytetrahydrofuran which on average is diolic.

The isocyanate content of component (a) is from 0.5 to 10.0%. Preferably it is from 1.0 to 6.5%.

Component (b)

The reaction products of the invention can be prepared using at least one organic polyol. Suitable organic polyols ultimately include all organic monomeric compounds having at least 2 hydroxyl groups that are known in this context to the skilled person. Preferred are organic polyols having 2 to 6, more preferably 2 to 3, hydroxyl groups per molecule.

Suitable diols are, for example, glycols, such as ethylene glycol, propylene glycol, butylene glycol, 1,4-butanediol, 1,6-hexanediol, neopentyl glycol, and other diols, such as 1,4-dimethylolcyclohexane or 2-butyl-2-ethyl-1,3-propanediol. Suitable polyols of higher functionality (OH functionality more than 2) are, for example, trimethylolpropane, glycerol, penta-erythritol, and sorbitol.

Preferred organic polyols used are those having at least 3 hydroxyl groups, preferably exactly 3 hydroxyl groups. An especially preferred organic polyol is trimethylolpropane.

The Reaction Product

There are no peculiarities to the preparation of the reaction product. The components (a) and (b) are linked with one another via common-knowledge urethane-forming reactions of hydroxyl groups with isocyanate groups. The reaction may take place, for example, in bulk or in solution with typical organic solvents at temperatures of 50° C. to 150° C., for example. Use may of course also be made of typical catalysts such as sulfuric acid, sulfonic acids and/or tetraalkyl titanates, zinc and/or tin alkoxylates, dialkyltin oxides such as di-n-butyltin oxide, for example, or organic salts of the dialkyltin oxides. The reaction conditions specified here may of course also be employed in the reaction, analogous in this respect, of the above-described components (a1) and (a2).

The amounts of components (a) and (b) here are harmonized with one another in such a way that the ratio of the molar amount of isocyanate groups in component (a) to the molar amount of component (b) is in a range from 0.33 to 0.95 and the resulting reaction product has a number-average molecular weight of 700 to 20 000 g/mol. Preferably the ratio is in the range from 0.40 to 0.85 and very preferably in the ratio of 0.45 to 0.75. The molar amount of isocyanate groups here may be determined easily from the aforedetermined NCO content of component (a).

The resulting reaction product possesses preferably a number-average molecular weight of 1000 to 15 000 g/mol, more preferably of 1500 to 12 000 g/mol, and very preferably of 1800 to 10 000 g/mol.

As a result of the fact that a molar excess of component (b) in relation to the isocyanate groups is used in the reaction described above, and component (b) has at least two hydroxyl groups, the resulting reaction product is a hydroxy-functional reaction product.

For especially preferred reaction products it is the case that they are preparable by reaction of a component (a) having an isocyanate content of 1.0 to 6.5% with (b) trimethylolpropane, the amounts of components (a) and (b) being harmonized with one another in such a way that the ratio of the molar amount of isocyanate groups in component (a) to the molar amount of component (b) is in a range from 0.45 to 0.75 and the resulting reaction product has a number-average molecular weight of 1500 to 12 000 g/mol.

The Pigmented Aqueous Basecoat Material

The present invention relates further to a pigmented aqueous basecoat material which comprises at least one reaction product of the invention. All of the above-stated preferred embodiments in relation to the reaction product also apply, of course, to the basecoat material comprising the reaction product.

A basecoat material is understood to be a color-imparting intermediate coating material that is used in automotive finishing and general industrial painting. This basecoat material is generally applied to a metallic or plastics substrate which has been pretreated with a baked (fully cured) surfacer or primer-surfacer, or else, occasionally, is applied directly to the plastics substrate. Substrates used may also include existing paint systems, which may optionally require pretreatment as well (by abrading, for example). It has now become entirely customary to apply more than one basecoat film. Accordingly, in such a case, a first basecoat film constitutes the substrate for a second such film. A particular possibility in this context, instead of application to a coat of a baked surfacer, is to apply the first basecoat material directly to a metal substrate provided with a cured electrocoat, and to apply the second basecoat material directly to the first basecoat film, without separately curing the latter. To protect a basecoat film, or the uppermost basecoat film, from environmental effects in particular, at least an additional clearcoat film is applied over it. This is generally done in a wet-on-wet process—that is, the clearcoat material is applied without the basecoat film(s) being cured. Curing then takes place, finally, jointly. It is now also widespread practice to produce only one basecoat film on a cured electrocoat film, then to apply a clearcoat material, and then to cure these two films jointly. The latter is a preferred embodiment in the context of the present invention. The reason is that when using the reaction product of the invention, in spite of the production of only one basecoat and therefore of a consequent significant simplification in operation, the result is excellent stonechip resistance.

The sum total of the weight-percentage fractions, based on the total weight of the pigmented aqueous basecoat material, of all reaction products of the invention is preferably 0.1 to 20 wt %, more preferably 0.5 to 15 wt %, and very preferably 1.0 to 10 wt % or even 1.5 to 5 wt %.

Where the amount of the reaction product of the invention is below 0.1 wt %, it may be possible that no further improvement in adhesion and stonechip resistance is achieved. Where the amount is more than 20 wt %, there may in certain circumstances be disadvantages, on account of the then numerous potentially polar groups (hydroxyl groups) in the reaction product, in terms of the condensation resistance of the paint system produced from the basecoat material.

In the case of a possible particularization to basecoat materials comprising preferred reaction products in a specific proportional range, the following applies. The reaction products which do not fall within the preferred group may of course still be present in the basecoat material. In that case the specific proportional range applies only to the preferred group of reaction products. It is preferred nonetheless for the total proportion of reaction products, consisting of reaction products of the preferred group and reaction products which are not part of the preferred group, to be subject likewise to the specific proportional range.

In the case of restriction to a proportional range of 0.5 to 15 wt % and to a preferred group of reaction products, therefore, this proportional range evidently applies initially only to the preferred group of reaction products. In that case, however, it would be preferable for there to be likewise from 0.5 to 15 wt % in total present of all originally encompassed reaction products, consisting of reaction products from the preferred group and reaction products which do not form part of the preferred group. If, therefore, 5 wt % of reaction products of the preferred group are used, not more than 10 wt % of the reaction products of the nonpreferred group may be used.

The stated principle is valid, for the purposes of the present invention, for all stated components of the basecoat material and for their proportional ranges—for example, for the pigments, for the polyurethane resins as binders, or else for the crosslinking agents such as melamine resins (also known as melamine-formaldehyde resins).

The basecoat materials used in accordance with the invention comprise color and/or effect pigments. Such color pigments and effect pigments are known to those skilled in the art and are described, for example, in Römpp-Lexikon Lacke und Druckfarben, Georg Thieme Verlag, Stuttgart, N.Y., 1998, pages 176 and 451. The fraction of the pigments may be situated for example in the range from 1 to 40 wt %, preferably 2 to 35 wt %, more preferably 3 to 30 wt %, based on the total weight of the pigmented aqueous basecoat material.

Preferred basecoat materials in the context of the present invention are those which comprise, as binders, polymers curable physically, thermally, or both thermally and with actinic radiation. A "binder" in the context of the present invention and in accordance with relevant DIN EN ISO 4618 is the nonvolatile component of a coating composition, without pigments and fillers. Specific binders, accordingly, include, for example, typical coatings additives, the reaction product of the invention, or typical crosslinking agents described later on below, even if the expression is used primarily below in relation to particular polymers curable physically, thermally, or both thermally and with actinic radiation, as for example particular polyurethane resins.

Besides the reaction product of the invention, the pigmented aqueous basecoat materials of the invention more preferably comprise at least one further polymer, different from the reaction product, as binder, more particularly at least one polymer selected from the group consisting of polyurethanes, polyesters, poly(meth)acrylates and/or copolymers of the stated polymers, especially preferably at any rate, though not necessarily exclusively, at least one polyurethane-poly(meth)acrylate.

In the context of the present invention, the term "physical curing" means the formation of a film through loss of solvents from polymer solutions or polymer dispersions. Typically, no crosslinking agents are necessary for this curing.

In the context of the present invention, the term "thermal curing" means the heat-initiated crosslinking of a coating film, with either a separate crosslinking agent or else self-crosslinking binders being employed in the parent coating material. The crosslinking agent contains reactive functional groups which are complementary to the reactive functional groups present in the binders. This is commonly referred to by those in the art as external crosslinking. Where the complementary reactive functional groups or autoreactive functional groups—that is, groups which react with groups of the same kind—are already present in the binder molecules, the binders present are self-crosslinking. Examples of suitable complementary reactive functional groups and autoreactive functional groups are known from German patent application DE 199 30 665 A1, page 7 line 28 to page 9 line 24.

For the purposes of the present invention, actinic radiation means electromagnetic radiation such as near infrared (NIR), UV radiation, more particularly UV radiation, and particulate radiation such as electron radiation. Curing by UV radiation is commonly initiated by radical or cationic photoinitiators. Where thermal curing and curing with actinic light are employed in unison, the term "dual cure" is also used.

In the present invention preference is given both to basecoat materials which are curable physically and to those which are curable thermally. In the case of basecoat materials which are curable thermally, there is of course always also a proportion of physical curing. For reasons not least of ease of comprehension, however, these coating materials are referred to as thermally curable.

Preferred thermally curing basecoat materials are those which comprise as binder a polyurethane resin and/or polyurethane-poly(meth)acrylate, preferably a hydroxyl-containing polyurethane resin and/or polyurethane-poly(meth)acrylate, and as crosslinking agent an aminoplast resin or a blocked or nonblocked polyisocyanate, preferably an aminoplast resin. Among the aminoplast resins, melamine resins are preferred.

The sum total of the weight-percentage fractions, based on the total weight of the pigmented aqueous basecoat material, of all crosslinking agents, preferably aminoplast resins and/or blocked and/or nonblocked polyisocyanates, more particularly preferably melamine resins, is preferably 1 to 20 wt %, more preferably 1.5 to 17.5 wt %, and very preferably 2 to 15 wt % or even 2.5 to 10 wt %.

The polyurethane resin preferably present may be ionically and/or nonionically hydrophilically stabilized. In preferred embodiments of the present invention the polyurethane resin is ionically hydrophilically stabilized. The preferred polyurethane resins are linear or contain instances of branching. The polyurethane resin is more preferably one in whose presence olefinically unsaturated monomers have been polymerized. This polyurethane resin may be present alongside the polymer originating from the polymerization of the olefinically unsaturated monomers, without these polymers being bonded covalently to one another. Equally, however, the polyurethane resin may also be bonded covalently to the polymer originating from the polymerization of the olefinically unsaturated monomers. Both groups of the aforementioned resins, then, are copolymers, which in the case of the use of (meth)acrylate-group-containing monomers as olefinically unsaturated monomers, can also be called polyurethane-poly(meth)acrylates (see also earlier on above). This kind of polyurethane-poly(meth)acrylates are particularly preferred for use in the context of the present invention. The olefinically unsaturated monomers are thus preferably monomers containing (meth)acrylate groups. It is likewise preferred for the monomers containing (meth)acrylate groups to be used in combination with other olefinically unsaturated compounds which contain no (meth)acrylate groups. Olefinically unsaturated monomers bonded covalently to the polyurethane resin are more preferably monomers containing acrylate groups or (meth)acrylate groups. This form of polyurethane-poly(meth)acrylates is further preferred.

Suitable saturated or unsaturated polyurethane resins and/or polyurethane-poly(meth)acrylates are described, for example, in German patent application DE 199 14 896 A1, column 1, lines 29 to 49 and column 4, line 23 to column 11, line 5, German patent application DE 199 48 004 A1, page 4, line 19 to page 13, line 48, European patent application EP 0 228 003 A1, page 3, line 24 to page 5, line 40, European patent application EP 0 634 431 A1, page 3, line 38 to page 8, line 9, or international patent application WO 92/15405, page 2, line 35 to page 10, line 32, or German patent application DE 44 37 535 A1.

The polyurethane resin is prepared using preferably the aliphatic, cycloaliphatic, aliphatic-cycloaliphatic, aromatic, aliphatic-aromatic and/or cycloaliphatic-aromatic polyisocyanates that are known to the skilled person.

As alcohol component for preparing the polyurethane resins, preference is given to using the saturated and unsaturated polyols of relatively high molecular mass and of low molecular mass, and also, optionally, monoalcohols, in minor amounts, that are known to the skilled person. Low molecular mass polyols used are more particularly diols and, in minor amounts, triols, for introducing instances of branching. Examples of suitable polyols of relatively high molecular mass are saturated or olefinically unsaturated polyester polyols and/or polyether polyols. Relatively high molecular mass polyols used are more particularly polyester polyols, especially those having a number-average molecular weight of 400 to 5000 g/mol.

For hydrophilic stabilization and/or for increasing the dispersibility in aqueous medium, the polyurethane resin preferably present may contain particular ionic groups and/or groups which can be converted into ionic groups (potentially ionic groups). Polyurethane resins of this kind are referred to in the context of the present invention as ionically hydrophilically stabilized polyurethane resins. Likewise present may be nonionic hydrophilically modifying groups. Preferred, however, are the ionically hydrophilically stabilized polyurethanes. In more precise terms, the modifying groups are alternatively functional groups which can be converted to cations by neutralizing agents and/or quaternizing agents, and/or cationic groups (cationic modification)

or functional groups which can be converted to anions by neutralizing agents, and/or anionic groups (anionic modification)

and/or nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted to cationic groups by neutralizing agents and/or quaternizing agents). Mention should also be made of the cationic groups—groups prepared from the aforementioned functional groups using neutralizing agents and/or quaternizing agents known to those skilled in the art—such as primary, secondary, tertiary and/or quaternary ammonium groups, tertiary sulfonium groups and/or quaternary phosphonium groups, more particularly quaternary ammonium groups and tertiary sulfonium groups.

As is well known, the functional groups for anionic modification are, for example, carboxylic acid, sulfonic acid and/or phosphonic acid groups, more particularly carboxylic acid groups (functional groups which can be converted to anionic groups by neutralizing agents), and also anionic groups—groups prepared from the aforementioned functional groups using neutralizing agents known to the skilled person—such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications can be introduced into the polyurethane resin through monomers which contain the (potentially) ionic groups. The nonionic modifications are introduced, for example, through the incorporation of poly(ethylene) oxide polymers as lateral or terminal groups in the polyurethane molecules. The hydrophilic modifications are introduced, for example, via compounds which contain at least one group reactive toward isocyanate groups, preferably at least one hydroxyl group. The ionic modification can be introduced using monomers which, as well as the modifying groups, contain at least one hydroxyl group. To introduce the nonionic modifications, preference is given to using the polyether diols and/or alkoxypoly(oxyalkylene) alcohols known to those skilled in the art.

As already indicated above, the polyurethane resin may preferably be a graft polymer by means of olefinically unsaturated monomers. In this case, then, the polyurethane is grafted, for example, with side groups and/or side chains that are based on olefinically unsaturated monomers. These are more particularly side chains based on poly(meth)acrylates, with the systems in question then being the polyurethane-poly(meth)acrylates already described above. Poly(meth)acrylates for the purposes of the present invention are polymers or polymeric radicals which comprise monomers containing acrylate and/or methacrylate groups, and preferably consist of monomers containing acrylate groups and/or methacrylate groups. Side chains based on poly(meth)acrylates are understood to be side chains which are constructed during the graft polymerization, using monomers containing (meth)acrylate groups. In the graft polymerization, preference here is given to using more than 50 mol %, more particularly more than 75 mol %, especially 100 mol %, based on the total amount of the monomers used in the graft polymerization, of monomers containing (meth)acrylate groups.

The side chains described are introduced into the polymer preferably after the preparation of a primary polyurethane resin dispersion (see also description earlier on above). In this case the polyurethane resin present in the primary dispersion may contain lateral and/or terminal olefinically unsaturated groups via which, then, the graft polymerization with the olefinically unsaturated compounds proceeds. The polyurethane resin for grafting may therefore be an unsaturated polyurethane resin. The graft polymerization is in that case a radical polymerization of olefinically unsaturated reactants. Also possible, for example, is for the olefinically unsaturated compounds used for the graft polymerization to contain at least one hydroxyl group. In that case it is also possible first for there to be attachment of the olefinically unsaturated compounds via these hydroxyl groups through reaction with free isocyanate groups of the polyurethane resin. This attachment takes place instead of or in addition to the radical reaction of the olefinically unsaturated compounds with the lateral and/or terminal olefinically unsaturated groups optionally present in the polyurethane resin. This is then followed again by the graft polymerization via radical polymerization, as described earlier on above. The result in any case is polyurethane resins grafted with olefinically unsaturated compounds, preferably olefinically unsaturated monomers.

As olefinically unsaturated compounds with which the polyurethane resin is preferably grafted it is possible to use virtually all radically polymerizable, olefinically unsaturated, and organic monomers which are available to the skilled person for these purposes. A number of preferred monomer classes may be specified by way of example:

hydroxyalkyl esters of (meth)acrylic acid or of other alpha-, beta-ethylenically unsaturated carboxylic acids, (meth)acrylic acid alkyl and/or cycloalkyl esters having up to 20 carbon atoms in the alkyl radical, ethylenically unsaturated monomers comprising at least one acid group, more particularly exactly one carboxyl group, such as (meth)acrylic acid, for example, vinyl esters of monocarboxylic acids which are branched in alpha-position and have 5 to 18 carbon atoms, reaction products of (meth)acrylic acid with the glycidyl ester of a monocarboxylic acid which is branched in alpha-position and has 5 to 18 carbon atoms, further ethylenically unsaturated monomers such as olefins (ethylene for example), (meth)acrylamides, vinylaromatic hydrocarbons (styrene for example), vinyl compounds such as vinyl chloride and/or vinyl ethers such as ethyl vinyl ether.

Used with preference are monomers containing (meth)acrylate groups, and so the side chains attached by grafting are poly(meth)acrylate-based side chains.

The lateral and/or terminal olefinically unsaturated groups in the polyurethane resin, via which the graft polymerization with the olefinically unsaturated compounds can proceed, are introduced into the polyurethane resin preferably via particular monomers. These particular monomers, in addition to an olefinically unsaturated group, also include, for example, at least one group that is reactive toward isocyanate groups. Preferred are hydroxyl groups and also primary and secondary amino groups. Especially preferred are hydroxyl groups.

The monomers described through which the lateral and/or terminal olefinically unsaturated groups may be introduced into the polyurethane resin may also, of course, be employed without the polyurethane resin being additionally grafted thereafter with olefinically unsaturated compounds. It is preferred, however, for the polyurethane resin to be grafted with olefinically unsaturated compounds.

The polyurethane resin preferably present may be a self-crosslinking and/or externally crosslinking binder. The polyurethane resin preferably comprises reactive functional groups through which external crosslinking is possible. In that case there is preferably at least one crosslinking agent in the pigmented aqueous basecoat material. The reactive functional groups through which external crosslinking is possible are more particularly hydroxyl groups. With particular advantage it is possible, for the purposes of the method of the invention, to use polyhydroxy-functional polyurethane resins. This means that the polyurethane resin contains on average more than one hydroxyl group per molecule.

The polyurethane resin is prepared by the customary methods of polymer chemistry. This means, for example, the polymerization of polyisocyanates and polyols to polyurethanes, and the graft polymerization that preferably then follows with olefinically unsaturated compounds. These methods are known to the skilled person and can be adapted individually. Exemplary preparation processes and reaction conditions can be found in European patent EP 0521 928 B1, page 2, line 57 to page 8, line 16.

The polyurethane resin preferably present possesses, for example, a hydroxyl number of 0 to 250 mg KOH/g, but more particularly from 20 to 150 mg KOH/g. The acid number of the polyurethane resin is preferably 5 to 200 mg KOH/g, more particularly 10 to 40 mg KOH/g. The hydroxyl number is determined in the context of the present invention in accordance with DIN 53240.

The polyurethane resin content is preferably between 5 and 80 wt %, more preferably between 8 and 70 wt %, and more preferably between 10 and 60 wt %, based in each case on the film-forming solids of the basecoat material.

Irrespective of occasional reference in the context of the present invention both to polyurethanes (also called polyurethane resins) and to polyurethane-poly(meth)acrylates, the expression "polyurethanes", as a generic term, embraces the polyurethane-poly(meth)acrylates. If, therefore, no distinction is made between the two classes of polymer in a particular passage, but instead only the expression "polyurethane" or "polyurethane resin" is stated, both polymer classes are encompassed.

By film-forming solids, corresponding ultimately to the binder fraction, is meant the nonvolatile weight fraction of the basecoat material, without pigments and, where appropriate, fillers. The film-forming solids can be determined as follows: A sample of the pigmented aqueous basecoat material (approximately 1 g) is admixed with 50 to 100 times the amount of tetrahydrofuran and then stirred for around 10 minutes. The insoluble pigments and any fillers are then removed by filtration and the residue is rinsed with a little THF, the THF being removed from the resulting filtrate on a rotary evaporator. The residue of the filtrate is dried at 120° C. for two hours and the resulting film-forming solids are obtained by weighing.

The sum total of the weight-percentage fractions, based on the total weight of the pigmented aqueous basecoat material, of all polyurethane resins is preferably 2 to 40 wt %, more preferably 2.5 to 30 wt %, and very preferably 3 to 25 wt %.

There is preferably also a thickener present. Suitable thickeners are inorganic thickeners from the group of the phyllosilicates. As well as the inorganic thickeners, however, it is also possible to use one or more organic thickeners. These are preferably selected from the group consisting of (meth)acrylic acid-(meth)acrylate copolymer thickeners, as for example the commercial product Rheovis AS 1130 (BASF), and of polyurethane thickeners, as for example the commercial product Rheovis PU 1250 (BASF). The thickeners used are different from the binders used.

Furthermore, the pigmented aqueous basecoat material may further comprise at least one adjuvant. Examples of such adjuvants are salts which can be decomposed thermally without residue or substantially without residue, resins as binders that are curable physically, thermally and/or with actinic radiation and are different from the above-described polymers, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and matting agents. Also included may be thickeners such as organic thickeners from the group of the phyllosilicates or organic thickeners such as (meth)acrylic acid-(meth)acrylate copolymer thickeners, or else polyurethane thickeners, which are different from the binders used.

Suitable adjuvants of the aforementioned kind are known, for example, from
    German patent application DE 199 48 004 A1, page 14, line 4, to page 17, line 5,
    German patent DE 100 43 405 C1 column 5, paragraphs [0031] to [0033].

They are used in the customary and known amounts.

The solids content of the basecoat materials of the invention may vary according to the requirements of the case in hand. The solids content is guided primarily by the viscosity required for application, more particularly for spray application, and so may be adjusted by the skilled person on the basis of his or her general art knowledge, optionally with assistance from a few exploratory tests.

The solids content of the basecoat materials is preferably 5 to 70 wt %, more preferably 8 to 60 wt %, and very preferably 12 to 55 wt.

By solids content (nonvolatile fraction) is meant that weight fraction which remains as a residue on evaporation under specified conditions. In the present application, the solids content, unless explicitly indicated otherwise, is determined in accordance with DIN EN ISO 3251. This is done by evaporating the basecoat material (test sample 1.0 g) at 130° C. for 60 minutes.

Unless indicated otherwise, this test method is likewise employed in order to determine, for example, the fraction of various components of the basecoat material as a proportion of the total weight of the basecoat material. Thus, for example, the solids content of a dispersion of a polyurethane resin which is to be added to the basecoat material may be determined correspondingly in order to ascertain the fraction of this polyurethane resin as a proportion of the overall composition. The method is likewise employed in order to determine the amount or a property of various further components. If, for example, the amount or a property of a component (a) present in the solvent, able to be used for preparing reaction products of the invention, is determined, this method is employed. In this connection, reference may be made, for example, to the isocyanate content of a component (a) (that is, the component (a) per se (solid body) and without solvent). The situation is the same, for example, with the OH number of a polymer to be used in the basecoat material.

The basecoat material of the invention is aqueous. The expression "aqueous" is known in this context to the skilled person. The phrase refers in principle to a basecoat material which is not based exclusively on organic solvents, i.e., does not contain exclusively organic-based solvents as its solvents but instead, in contrast, includes a significant fraction of water as solvent. "Aqueous" for the purposes of the present invention should preferably be understood to mean that the coating composition in question, more particularly the basecoat material, has a water fraction of at least 40 wt %, preferably at least 50 wt %, very preferably at least 60 wt %, based in each case on the total amount of the solvents present (i.e., water and organic solvents). Preferably in turn, the water fraction is 40 to 90 wt %, more particularly 50 to 80 wt %, very preferably 60 to 75 wt %, based in each case on the total amount of the solvents present.

The basecoat materials employed in accordance with the invention may be produced using the mixing assemblies and mixing techniques that are customary and known for producing basecoat materials.

The Method of the Invention and the Multicoat Paint System of the Invention

A further aspect of the present invention is a method for producing a multicoat paint system, by
(1) applying a pigmented aqueous basecoat material to a substrate,
(2) forming a polymer film from the coating material applied in stage (1),
(3) applying a clearcoat material to the resultant basecoat, and then
(4) curing the basecoat together with the clearcoat,
which comprises using in stage (1) a pigmented aqueous basecoat material which comprises at least one reaction product of the invention. All of the above observations relating to the reaction product of the invention and to the pigmented aqueous basecoat material are also valid in respect of the method of the invention. This is true more particularly also of all preferred, very preferred, and especially preferred features.

Said method is preferably used to produce multicoat color paint systems, effect paint systems, and color and effect paint systems.

The pigmented aqueous basecoat material used in accordance with the invention is commonly applied to metallic or plastics substrates that have been pretreated with surfacer or primer-surfacer. Said basecoat material may optionally also be applied directly to the plastics substrate.

Where a metallic substrate is to be coated, it is preferably further coated with an electrocoat system before the surfacer or primer-surfacer is applied.

Where a plastics substrate is being coated, it is preferably also pretreated before the surfacer or primer-surfacer is applied. The techniques most frequently employed for such pretreatment are those of flaming, plasma treatment, and corona discharge. Flaming is used with preference.

Application of the pigmented aqueous basecoat material of the invention to metallic substrates already coated, as described above, with cured electrocoat systems and/or surfacers may take place in the film thicknesses customary within the automobile industry, in the range, for example, of 5 to 100 micrometers, preferably 5 to 60 micrometers (dry film thickness). This is done using spray application methods, as for example compressed air spraying, airless spraying, high-speed rotation, electrostatic spray application (ESTA), alone or in conjunction with hot spray application, such as for example, hot air spraying.

Following the application of the pigmented aqueous basecoat material, it can be dried by known methods. For example, (1-component) basecoat materials, which are preferred, can be flashed at room temperature for 1 to 60 minutes and subsequently dried, preferably at optionally slightly elevated temperatures of 30 to 90° C. Flashing and drying in the context of the present invention mean the evaporation of organic solvents and/or water, as a result of which the paint becomes drier but has not yet cured or not yet formed a fully crosslinked coating film.

Then a commercial clearcoat material is applied, by likewise common methods, the film thicknesses again being within the customary ranges, for example 5 to 100 micrometers (dry film thickness).

After the clearcoat material has been applied, it can be flashed at room temperature for 1 to 60 minutes, for example, and optionally dried. The clearcoat material is then cured together with the applied pigmented basecoat material. In the course of these procedures, crosslinking reactions occur, for example, to produce on a substrate a multicoat color and/or effect paint system of the invention. Curing takes place preferably thermally at temperatures from 60 to 200° C. Thermally curing basecoat materials are preferably those which comprise as additional binder a polyurethane resin and as crosslinking agent an aminoplast resin or a blocked or nonblocked polyisocyanate, preferably an aminoplast resin. Among the aminoplast resins, melamine resins are preferred.

In one particular embodiment, the method for producing a multicoat paint system comprises the following steps:
producing a cured electrocoat film on the metallic substrate by electrophoretic application of an electrocoat material to the substrate and subsequent curing of the electrocoat material,
producing (i) a basecoat film or (ii) a plurality of basecoat films directly following one another directly on the cured electrocoat film by (i) application of an aqueous basecoat material directly to the electrocoat film, or (ii) directly successive application of two or more basecoat materials to the electrocoat film,
producing a clearcoat film directly on (i) the basecoat film or (ii) the uppermost basecoat film, by application of a clearcoat material directly to (i) one basecoat film or (ii) the uppermost basecoat film,
where (i) one basecoat material or (ii) at least one of the basecoat materials is a basecoat material of the invention, joint curing of the basecoat film (i) or of the basecoat films (ii) and also of the clearcoat film.

In the latter embodiment, then, in comparison to the above-described standard methods, there is no application and separate curing of a commonplace surfacer. Instead, all of the films applied to the electrocoat film are cured jointly, thereby making the overall operation much more economical. Nevertheless, in this way, and particularly through the use of a basecoat material of the invention comprising a reaction product of the invention, multicoat paint systems are constructed which have outstanding mechanical stability and adhesion and hence are particularly technologically outstanding.

The application of a coating material directly to a substrate or directly to a previously produced coating film is understood as follows: The respective coating material is applied in such a way that the coating film produced from it is disposed on the substrate (on the other coating film) and is in direct contact with the substrate (with the other coating film). Between coating film and substrate (other coating film), therefore, there is more particularly no other coat. Without the detail "direct", the applied coating film, while disposed on the substrate (the other film), need not necessarily be present in direct contact. More particularly, further coats may be disposed between them. In the context of the present invention, therefore, the following is the case: In the absence of particularization as to "direct", there is evidently no restriction to "direct".

Plastics substrates are coated basically in the same way as metallic substrates. Here, however, in general, curing takes place at significantly lower temperatures, of 30 to 90° C. Preference is therefore given to the use of two-component clearcoat materials.

The method of the invention can be used to paint metallic and nonmetallic substrates, more particularly plastics substrates, preferably automobile bodies or components thereof.

The method of the invention can be used further for dual finishing in OEM finishing. This means that a substrate which has been coated by means of the method of the invention is painted for a second time, likewise by means of the method of the invention.

The invention relates further to multicoat paint systems which are producible by the method described above. These multicoat paint systems are to be referred to below as multicoat paint systems of the invention.

All of the above observations relating to the reaction product of the invention and to the pigmented aqueous basecoat material are also valid in respect of said multicoat paint system and of the method of the invention. This is also true especially of all the preferred, more preferred and most preferred features.

The multicoat paint systems of the invention are preferably multicoat color paint systems, effect paint systems, and color and effect paint systems.

A further aspect of the invention relates to the method of the invention, wherein said substrate from stage (1) is a multicoat paint system having defects. This substrate/multicoat paint system, which possesses defects, is therefore an original finish, which is to be repaired or completely recoated.

The method of the invention is suitable accordingly for repairing defects on multicoat paint systems. Film defects are generally faults on and in the coating, usually named according to their shape or their appearance. The skilled person is aware of a host of possible kinds of such film defects. They are described for example in Römpp-Lexikon Lacke und Druckfarben, Georg Thieme Verlag, Stuttgart, N.Y., 1998, page 235, "Film defects".

The multicoat paint systems produced by means of the method of the invention may likewise have such defects. In one preferred embodiment of the method of the invention, therefore, the substrate from stage (1) is a multicoat paint system of the invention which exhibits defects.

These multicoat paint systems are produced preferably on automobile bodies or parts thereof, by means of the method of the invention, identified above, in the context of automotive OEM finishing. Where such defects occur directly after OEM finishing has taken place, they are repaired immediately. The term "OEM automotive refinishing" is therefore also used. Where only small defects require repair, only the "spot" is repaired, and the entire body is not completely recoated (dual coating). The former process is called "spot repair". The use of the method of the invention for remedying defects on multicoat paint systems (original finishes) of the invention in OEM automotive refinishing, therefore, is particularly preferred.

Where reference is made, in the context of the present invention, to the automotive refinish segment, in other words when the repair of defects is the topic, and the substrate specified is a multicoat paint system possessing defects, this of course means that this substrate/multicoat paint system with defects (original finish) is generally located on a plastic substrate or on a metallic substrate as described above.

So that the repaired site has no color difference from the rest of the original finish, it is preferred for the aqueous basecoat material used in stage (1) of the method of the invention for repairing defects to be the same as that which was used to produce the substrate/multicoat paint system with defects (original finish).

The observations above concerning the reaction product of the invention and the aqueous pigmented basecoat material therefore are also valid for the use, under discussion, of the method of the invention for repairing defects on a multicoat paint system. This is also true in particular of all stated preferred, very preferred, and especially preferred features. It is additionally preferred for the multicoat paint systems of the invention that are to be repaired to be multicoat color paint systems, effect paint systems, and color and effect paint systems.

The above-described defects on the multicoat paint system of the invention can be repaired by means of the above-described method of the invention. For this purpose, the surface to be repaired on the multicoat paint system may initially be abraded. The abrading is preferably performed by partially sanding, or sanding off, only the basecoat and the clearcoat, optionally only the clearcoat, from the original finish, but not sanding off the primer layer and surfacer layer that are generally situated beneath them. In this way, during the refinish, there is no need in particular for renewed application of specialty primers and primer-surfacers. This form of abrading has become established especially in the OEM automotive refinishing segment, since here, in contrast to refinishing in a workshop, generally speaking, defects occur only in the basecoat and/or clearcoat region, but do not, in particular, occur in the region of the underlying surfacer and primer coats. Defects in the latter coats are more likely to be encountered in the workshop refinish sector. Examples include paint damage such as scratches, which are produced, for example, by mechanical effects and which often extend down to the substrate surface (metallic or plastic substrate).

After the abrading procedure, the pigmented aqueous basecoat material is applied to the defect site in the original finish by spray application: for example, by pneumatic atomization. After the pigmented aqueous basecoat material has been applied, it can be dried by known methods. For example, the basecoat material may be dried at room temperature for 1 to 60 minutes and subsequently dried at optionally slightly elevated temperatures of 30 to 80° C. Flashing and drying for the purposes of the present invention means evaporation of organic solvents and/or water, whereby the coating material is as yet not fully cured. For the purposes of the present invention it is preferred for the basecoat material to comprise a polyurethane resin as binder and an aminoplast resin, preferably a melamine resin, as crosslinking agent.

A commercial clearcoat material is subsequently applied, by techniques that are likewise commonplace. Following application of the clearcoat material, it may be flashed off at room temperature for 1 to 60 minutes, for example, and optionally dried. The clearcoat material is then cured together with the applied pigmented basecoat material.

In the case of so-called low-temperature baking, curing takes place preferably at temperatures of 20 to 90° C. Preference here is given to using two-component clearcoat materials. If, as described above, a polyurethane resin is used as further binder and an aminoplast resin is used as crosslinking agent, there is only slight crosslinking by the aminoplast resin in the basecoat film at these temperatures. Here, in addition to its function as a curing agent, the aminoplast resin also serves for plasticizing and may assist pigment wetting. Besides the aminoplast resins, nonblocked isocyanates may also be used. Depending on the nature of the isocyanate used, they crosslink at temperatures from as low as 20° C. Waterborne basecoat materials of this kind are then of course generally formulated as two-component systems.

In the case of what is called high-temperature baking, curing is accomplished preferably at temperatures of 130 to 160° C. Here both one-component and two-component clearcoat materials are used. If, as described above, a polyurethane resin is used as further binder and an aminoplast resin is used as crosslinking agent, there is crosslinking by the aminoplast resin in the basecoat film at these temperatures.

A further aspect of the present invention is the use of the reaction product of the invention in pigmented aqueous basecoat materials for improving the adhesion and the stonechip resistance of paint systems produced using the basecoat material.

The invention is illustrated below using examples.

EXAMPLES

Determination of the Number-Average Molecular Weight:

The number-average molecular weight was determined by means of vapor pressure osmosis. Measurement took place using a vapor pressure osmometer (model 10.00 from Knauer) on concentration series of the test component in toluene at 50° C. with benzophenone as calibration compound for the determination of the experimental calibration constant of the instrument used (according to E. Schröder, G. Müller, K.-F. Arndt, "Leitfaden der Polymercharakterisierung" [Principles of polymer characterization], Academy-Verlag, Berlin, pp. 47-54, 1982, where the calibration compound used was in fact benzil).

Isocyanate Content:

The isocyanate content, also referred to hereinafter as NCO content, is determined by adding an excess of a 2% strength N,N-dibutylamine solution in xylene to a homogeneous solution of the samples in acetone/N-ethyl-pyrrolidone (1:1 vol %), by potentiometric back-titration of the amine excess with 0.1 N hydrochloric acid in accordance with DIN EN ISO 3251, DIN EN ISO 11909 and DIN EN ISO 14896. Via the fraction of a component (solid body) in solution it is possible to calculate back to the NCO content of the component per se. The NCO content therefore indicates the weight-based percentage fraction of NCO groups as a proportion of the total weight of the respective component.

Production of Inventive Reaction Products (IR) and Also of Reaction Products Used for Comparison (CR):

IR1:

In a 4 l stainless steel reactor equipped with anchor stirrer, thermometer, condenser, 466.8 g of isophorone diisocyanate, 918 g of methyl ethyl ketone, 910 g of PolyTHF650 (from BASF SE) with an OH number of 172 mg KOH/g (1.4 mol), and 0.69 g of dibutyltin dilaurate are heated to 80° C. This temperature is maintained until the NCO content, based on the solids content of the solution, is constant and is in a range from 2.0 to 2.1% (thus corresponding to the NCO content of component (a)). At this point 150 g of trimethylolpropane are added and the temperature stated above is further maintained until the NCO value has reached less than 0.1%. Thereafter the methyl ethyl ketone is removed by distillation under reduced pressure down to a level of less than 0.5%, and the resulting resin is diluted at 80° C. with 640 g of butyl glycol.

The solids content of the resin solution is 67% (measured at 130° C. for 1 h in a forced air oven on a 1 g sample with addition of 1 ml of methyl ethyl ketone)

Number-average molecular weight (vapor pressure osmosis): 2400 g/mol

Viscosity 50% in butyl glycol: 2940 mPas (measured at 23° C. using a Brookfield CAP 2000+ rotary viscometer, spindle 3, shear rate: 750 $s^{-1}$).

IR2:

In a 4 l stainless steel reactor equipped with anchor stirrer, thermometer, condenser, 382.3 g of isophorone diisocyanate, 1401 g of methyl ethyl ketone, 1720 g of PolyTHF2000 (from BASF SE) with an OH number of 56 mg KOH/g (0.86 mol), and 1.05 g of dibutyltin dilaurate are heated to 80° C. This temperature is maintained until the NCO content, based on the solids content of the solution, is constant and is in a range from 1.6% to 1.7% (thus corresponding to the NCO content of component (a)). At this point 179 g of trimethylolpropane are added and the temperature stated above is further maintained until the NCO value has reached less than 0.1%. Thereafter the methyl ethyl ketone is removed by distillation under reduced pressure down to a level of less than 0.5%, and the resulting resin is diluted at 80° C. with 570 g of butyl glycol.

The solids content of the resin solution is 78% (measured at 130° C. for 1 h in a forced air oven on a 1 g sample with addition of 1 ml of methyl ethyl ketone)

Number-average molecular weight (vapor pressure osmosis): 2600 g/mol

Viscosity 50% in butyl glycol: 3475 mPas (measured at 23° C. using a Brookfield CAP 2000+ rotary viscometer, spindle 3, shear rate: 750 $s^{-1}$).

CR1:

The reaction product used for comparison was a polyester prepared according to example D, column 16, lines 37 to 59 of DE 4009858 A, the organic solvent used being butyl glycol rather than butanol, meaning that solvents present are butyl glycol and water. The corresponding dispersion of the polyester has a solids content of 60 wt %.

Preparation of Aqueous Basecoat Materials

The following should be taken into account regarding formulation constituents and amounts thereof as indicated in the tables hereinafter. When reference is made to a commercial product or to a preparation protocol described elsewhere, the reference, independently of the principal designation selected for the constituent in question, is to precisely this commercial product or precisely the product prepared with the referenced protocol.

Accordingly, where a formulation constituent possesses the principal designation "melamine-formaldehyde resin" and where a commercial product is indicated for this constituent, the melamine-formaldehyde resin is used in the form of precisely this commercial product. Any further constituents present in the commercial product, such as solvents, must therefore be taken into account if conclusions are to be drawn about the amount of the active substance (of the melamine-formaldehyde resin).

If, therefore, reference is made to a preparation protocol for a formulation constituent, and if such preparation results, for example, in a polymer dispersion having a defined solids content, then precisely this dispersion is used. The overriding factor is not whether the principal designation that has been selected is the term "polymer dispersion" or merely the active substance, as for example "polymer", "polyester" or "polyurethane-modified polyacrylate". This must be taken into account if conclusions are to be drawn concerning the amount of the active substance (of the polymer).

All proportions indicated in the tables are parts by weight.

Preparation of a Non-Inventive Waterborne Basecoat Material 1

The components listed under "Aqueous phase" in table A were stirred together in the order stated to form an aqueous mixture. In the next step, an organic mixture was prepared from the components listed under "Organic phase". The organic mixture was added to the aqueous mixture. The combined mixtures were then stirred for 10 minutes and adjusted using deionized water and dimethylethanolamine to a pH of 8 and to a spray viscosity of 58 mPas under a shearing load of 1000 $s^{-1}$, measured using a rotational viscometer (Rheomat RM 180 instrument from Mettler-Toledo) at 23° C.

TABLE A

Waterborne basecoat material 1

| Component | Parts by weight |
|---|---|
| Aqueous phase | |
| Aqueous solution of 3% sodium lithium magnesium phyllosilicate Laponite ® RD (from Altana-Byk) and 3% Pluriol ® P900 (from BASF SE) | 27 |
| Deionized water | 15.9 |
| Butyl glycol (from BASF SE) | 3.5 |
| Hydroxy-functional, polyurethane-modified polyacrylate; prepared as per page 7, line 55 to page 8, line 23 of DE 4437535 A1 | 2.4 |
| 50 wt % strength solution of Rheovis ® PU 1250 (BASF SE) in butyl glycol, rheological agent | 0.2 |
| CR1 | 2.5 |
| TMDD 50% BG (from BASF SE), 52% strength solution of 2,4,7,9-tetramethyl-5-decyne-4,7-diol in butyl glycol | 1.2 |
| Luwipal ® 052 (from BASF SE), melamine-formaldehyde resin | 4.7 |
| 10% strength solution of N,N-dimethylethanolamine (from BASF SE) in water | 0.5 |
| Polyurethane-based graft copolymer; prepared in analogy to DE 19948004 A1 (page 27 - example 2) | 19.6 |
| Isopropanol (from BASF SE) | 1.4 |
| Byk-347 ® (from Altana-Byk) | 0.5 |
| Pluriol ® P900 (from BASF SE) | 0.3 |
| Tinuvin ® 384-2 (from BASF SE) | 0.6 |
| Tinuvin ® 123 (from BASF SE) | 0.3 |
| Carbon black paste | 4.3 |
| Blue paste | 11.4 |
| Mica slurry | 2.8 |
| Organic phase | |
| Aluminum pigment (from Altana-Eckart) | 0.3 |
| Butyl glycol (from BASF SE) | 0.3 |
| Polyurethane-based graft copolymer; prepared in analogy to DE 19948004 A1 (page 27 - example 2) | 0.3 |

Preparation of Blue Paste:

The blue paste was prepared from 69.8 parts by weight of an acrylated polyurethane dispersion prepared as per international patent application WO 91/15528, binder dispersion A, 12.5 parts by weight of Paliogen® Blue L 6482, 1.5 parts by weight of dimethylethanolamine (10% strength in DI water), 1.2 parts by weight of a commercial polyether (Pluriol® P900 from BASF SE), and 15 parts by weight of deionized water.

Preparation of Carbon Black Paste:

The carbon black paste was prepared from 25 parts by weight of an acrylated polyurethane dispersion prepared as per international patent application WO 91/15528, binder dispersion A, 10 parts by weight of carbon black, 0.1 part by weight of methyl isobutyl ketone, 1.45 parts by weight of dimethylethanolamine (10% strength in DI water), 2 parts by weight of a commercial polyether (Pluriol® P900 from BASF SE), and 61.45 parts by weight of deionized water.

Preparation of the Mica Slurry:

The mica slurry was obtained by using a stirring element to mix 1.5 parts by weight of polyurethane-based graft copolymer, prepared in an analogy to DE 19948004 A1 (page 27—example 2), and 1.3 parts by weight of the commercial Mica Mearlin Ext. Fine Violet 539V from Merck.

Preparation of Inventive Waterborne Basecoat Materials I1 and I2

The waterborne basecoat materials I1 and I2 were prepared in analogy to table A, but using the reaction product IR1 (waterborne basecoat material I1) or the reaction product IR2 (waterborne basecoat material I2) in place of CR1. The proportion used of the reaction product IR1 or IR2 was respectively the same, through compensation of the amount of solvent and/or consideration of the solids content of the component to be added.

TABLE B

Basecoat materials 1, I1 and I2

| | Reaction product |
|---|---|
| Waterborne basecoat material 1 | CR1 |
| Waterborne basecoat material I1 | IR1 |
| Waterborne basecoat material I2 | IR2 |

Comparison Between Waterborne Basecoat Materials 1 and I1, I2

Stonechip Resistance:

For the determination of the stonechip resistance, the multicoat paint systems were produced according to the following general protocol:

The substrate used was a steel panel with dimensions of 10×20 cm, coated with a cathodic e-coat (cathodic electrocoat).

Applied to this panel first of all was the respective basecoat material (table B), applied pneumatically with a target film thickness (dry film thickness) of 20 micrometers. After the basecoat had been flashed at room temperature for 1 minute, it was subjected to interim drying in a forced air oven at 70° C. for 10 minutes. Over the interim-dried waterborne basecoat, a customary two-component clearcoat material was applied with a target film thickness (dry film thickness) of 40 micrometers. The resulting clearcoat was flashed at room temperature for 20 minutes. The waterborne basecoat and the clearcoat were subsequently cured in a forced air oven at 160° C. for 30 minutes.

The resulting multicoat paint systems were tested for their stonechip resistance. This was done using the stonechip test of DIN 55966-1. The results of the stonechip test were assessed in accordance with DIN EN ISO 20567-1. Lower values represent better stonechip resistance.

The results are found in table 1. The waterborne basecoat material (WBM) detail indicates which WBM was used in the particular multicoat paint system.

TABLE 1

Stonechip resistance of waterborne basecoat materials 1 and I1, I2

| WBM | Stonechip outcome |
|---|---|
| 1 | 2.5 |
| I1 | 1.5 |
| I2 | 1.5 |

The results emphasize that the use of the inventive reaction products in basecoat materials significantly increases the stonechip resistance by comparison with the waterborne basecoat material 1.

Preparation of a Non-Inventive Waterborne Basecoat Material 2

The components listed under "Aqueous phase" in table C were stirred together in the order stated to form an aqueous mixture. The mixture was then stirred for 10 minutes and adjusted using deionized water and dimethylethanolamine to a pH of 8 and to a spray viscosity of 58 mPas under a shearing load of 1000 s$^{-1}$, measured using a rotational viscometer (Rheomat RM 180 instrument from Mettler-Toledo) at 23° C.

TABLE C

Waterborne basecoat material 2

| Component | Parts by weight |
|---|---|
| Aqueous phase | |
| Aqueous solution of 3% sodium lithium magnesium phyllosilicate Laponite ® RD (from Altana-Byk) and 3% Pluriol ® P900 (from BASF SE) | 14 |
| Deionized water | 16 |
| Butyl glycol (from BASF SE) | 1.4 |
| CR1 | 2.3 |
| 10 wt % strength solution of Rheovis ® AS 1130 (BASF SE) in deionized water, rheological agent | 6 |
| TMDD 50% BG (from BASF SE), 52% strength solution of 2,4,7,9-tetramethyl-5-decyne-4,7-diol in butyl glycol | 1.6 |
| Cymel ® 1133 (from Cytec), melamine-formaldehyde resin | 5.9 |
| 10% strength solution of N,N-dimethyl-ethanolamine (from BASF SE) in water | 0.4 |
| Polyurethane dispersion - prepared as per WO 92/15405 (page 14, line 13 to page 15, line 28) | 20 |
| 2-Ethylhexanol (from BASF SE) | 3.5 |
| Triisobutyl phosphate (from Bayer) | 2.5 |
| Nacure ® 2500 (from King Industries) | 0.6 |
| White paste | 24 |
| Carbon black paste | 1.8 |

Preparation of Carbon Black Paste:

The carbon black paste was prepared from 25 parts by weight of an acrylated polyurethane dispersion prepared as per international patent application WO 91/15528, binder dispersion A, 10 parts by weight of carbon black, 0.1 part by weight of methyl isobutyl ketone, 1.45 parts by weight of dimethylethanolamine (10% strength in DI water), 2 parts by weight of a commercial polyether (Pluriol® P900 from BASF SE), and 61.45 parts by weight of deionized water.

Preparation of White Paste:

The white paste was prepared from 43 parts by weight of an acrylated polyurethane dispersion prepared as per international patent application WO 91/15528, binder dispersion A, 50 parts by weight of titanium rutile 2310, 3 parts by weight of 1-propoxy-2-propanol, and 4 parts by weight of deionized water.

Preparation of Inventive Waterborne Basecoat Materials I3 and I4

The waterborne basecoat materials I3 and I4 were prepared in analogy to table C, but using the reaction product IR1 (waterborne basecoat material I3) or the reaction product IR2 (waterborne basecoat material I4) in place of CR1. The proportion used of the reaction product IR1 or IR2 was respectively the same, through compensation of the amount of solvent and/or consideration of the solids content of the component to be added.

TABLE D

Basecoat materials 2, I3 and I4

| | Reaction product |
|---|---|
| Waterborne basecoat material 2 | CR1 |
| Waterborne basecoat material I3 | IR1 |
| Waterborne basecoat material I4 | IR2 |

Preparation of a Non-Inventive Waterborne Basecoat Material 3

The components listed under "Aqueous phase" in table E were stirred together in the order stated to form an aqueous mixture. In the next step, an organic mixture was prepared from the components listed under "Organic phase". The organic mixture was added to the aqueous mixture. The combined mixtures were then stirred for 10 minutes and adjusted using deionized water and dimethylethanolamine to a pH of 8 and to a spray viscosity of 58 mPas under a shearing load of 1000 s$^{-1}$, measured using a rotational viscometer (Rheomat RM 180 instrument from Mettler-Toledo) at 23° C.

TABLE E

Waterborne basecoat material 3

| Component | Parts by weight |
|---|---|
| Aqueous phase | |
| Aqueous solution of 3% sodium lithium magnesium phyllosilicate Laponite ® RD (from Altana-Byk) and 3% Pluriol ® P900 (from BASF SE) | 20.35 |
| Deionized water | 17.27 |
| Butyl glycol (from BASF SE) | 2.439 |
| Hydroxy-functional, polyurethane-modified polyacrylate; prepared as per page 7, line 55 to page 8, line 23 of DE 4437535 A1 | 2.829 |
| 50 wt % strength solution of Rheovis ® PU 1250 (BASF SE) in butyl glycol, rheological agent | 0.234 |
| 10 wt % strength solution of Rheovis ® AS 1130 (BASF SE) in deionized water, rheological agent | 4.976 |
| TMDD 50% BG (from BASF SE), 52% strength solution of 2,4,7,9-tetramethyl-5-decyne-4,7-diol in butyl glycol | 1.317 |
| Cymel ® 1133 (from Cytec), melamine-formaldehyde resin | 3.512 |
| 10% strength solution of N,N-dimethyl-ethanolamine (from BASF SE) in water | 1.356 |
| Polyurethane dispersion - prepared as per WO 92/15405 (page 14, line 13 to page 15, line 28) | 24.976 |
| Isopropanol (from BASF SE) | 1.659 |
| Byk-347 ® (from Altana-Byk) | 0.537 |
| Pluriol ® P900 (from BASF SE) | 0.39 |
| 2-Ethylhexanol (from BASF SE) | 1.854 |
| Triisobutyl phosphate (from Bayer) | 1.151 |
| Nacure ® 2500 (from King Industries) | 0.39 |
| Tinuvin ® 384-2 (from BASF SE) | 0.605 |
| Tinuvin ® 123 (from BASF SE) | 0.39 |
| Blue paste | 0.605 |
| Organic phase | |
| Aluminum pigment 1 (from Altana-Eckart) | 4.585 |
| Aluminum pigment 2 (from Altana-Eckart) | 0.907 |

TABLE E-continued

Waterborne basecoat material 3

| Component | Parts by weight |
|---|---|
| Butyl glycol (from BASF SE) | 3.834 |
| Polyurethane-based graft copolymer; prepared in analogy to DE 19948004 A1 (page 27 - example 2) | 3.834 |

Preparation of Blue Paste:

The blue paste was prepared from 69.8 parts by weight of an acrylated polyurethane dispersion prepared as per international patent application WO 91/15528, binder dispersion A, 12.5 parts by weight of Paliogen® Blue L 6482, 1.5 parts by weight of dimethylethanolamine (10% strength in DI water), 1.2 parts by weight of a commercial polyether (Pluriol® P900 from BASF SE), and 15 parts by weight of deionized water.

Comparison of Waterborne Basecoat Materials 2 and I3, I4

For the determination of the stonechip resistance, the multicoat paint systems were produced according to the following general protocol:

The substrate used was a steel panel with dimensions of 10×20 cm, coated with a cathodic e-coat.

Applied to this panel first of all was the respective basecoat material (table D), which was applied with a target film thickness (dry film thickness) of 20 micrometers. After the basecoat had been flashed at room temperature for 4 minutes, the waterborne basecoat material 3 was applied in a target film thickness (dry film thickness) of 20 micrometers, followed by flashing at room temperature for 4 minutes and then by interim drying in a forced air oven at 70° C. for 10 minutes. Over the interim-dried waterborne basecoat, a customary two-component clearcoat material was applied with a target film thickness (dry film thickness) of 40 micrometers. The resulting clearcoat was flashed at room temperature for 20 minutes. The waterborne basecoat and the clearcoat were subsequently cured in a forced air oven at 160° C. for 30 minutes.

The results are found in table 2. The waterborne basecoat material (WBM) detail indicates which WBM was used in the particular multicoat paint system.

TABLE 2

Stonechip resistance of the waterborne basecoat materials 2 and I3, I4

| WBM | Stonechip result |
|---|---|
| 2 + 3 | 2.0 |
| I3 + 3 | 1.5 |
| I4 + 3 | 1.5 |

The results emphasize again that the use of the inventive reaction products in basecoat materials increases the stonechip resistance by comparison with non-inventive systems.

What is claimed is:

1. A method for producing a multicoat paint system by:
(1) applying a pigmented aqueous basecoat material to a substrate via spraying,
(2) forming a polymer film from the pigmented aqueous basecoat material applied in step (1),
(3) applying a clearcoat material to the polymer film, and subsequently
(4) curing the pigmented aqueous basecoat material together with the clearcoat material,
wherein the pigmented aqueous basecoat material used in step (1) comprises
a hydroxy-functional polyether-based reaction product that is preparable by urethane group-forming reaction of:
(a) at least one component containing isocyanate groups that is preparable by urethane group-forming reaction of at least one organic diisocyanate (a1) with at least one polyether (a2) of the general structural formula (I),

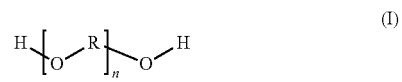

wherein R is a $C_3$ to $C_6$ alkylene radical, and n is selected accordingly such that the polyether (a2) possesses a number-average molecular weight of 500 to 5000 g/mol, wherein the components (a1) and (a2) are used in a molar ratio of 1.8/1.7 to 3.0/1.0, and a resulting component (a) has an isocyanate content of 1.0 to 6.5%, with
(b) at least one organic polyol, wherein the amounts of components (a) and (b) are harmonized with one another such that the ratio of the molar amount of isocyanate groups in component (a) to the molar amount of component (b) is in a range from 0.33 to 0.95, and the resulting reaction product has a number-average molecular weight of 700 to 20,000 g/mol.

2. The method as claimed in claim 1, wherein the polyether (a2) possesses a number-average molecular weight of 600 to 3,200 g/mol.

3. The method as claimed in claim 1, wherein the group R in the general structural formula (I) comprises tetramethylene radicals.

4. The method as claimed in claim 1, wherein the amounts of components (a) and (b) are harmonized with one another in such a way that the ratio of the molar amount of isocyanate groups in component (a) to the molar amount of component (b) is in a range from 0.40 to 0.85.

5. The method as claimed in claim 1, wherein the polyether-based reaction product possesses a number-average molecular weight of 1,500 to 12,000 g/mol.

6. The method as claimed in claim 1, wherein the sum total of the weight-percentage fractions, based on the total weight of the pigmented aqueous basecoat material, of all polyether-based reaction products is 0.1 to 20 wt %.

7. The method as claimed in claim 1, further comprising a melamine resin and also a polyurethane resin that is grafted by means of olefinically unsaturated monomers and that further comprises hydroxyl groups.

8. The method as claimed in claim 1, wherein the component (b) has three hydroxyl groups.

9. The method as claimed in claim 1, wherein the substrate from step (1) is a metallic substrate coated with a cured electrocoat, and all coats applied to the electrocoat are cured jointly.

10. The method as claimed in claim 1, wherein the substrate from step (1) is a metallic or plastics substrate.

11. A multicoat paint system producible by the method as claimed in claim 1.

* * * * *